United States Patent
Kalhoff

(10) Patent No.: US 7,337,028 B2
(45) Date of Patent: Feb. 26, 2008

(54) METHOD FOR THE ORGANIZATION OF A PROCESS HAVING AT LEAST ONE PROCESSING DEVICE FOR CARRYING OUT A PREDEFINABLE SUBPROCESS

(75) Inventor: Johannes Kalhoff, Blomberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 402 days.

(21) Appl. No.: 09/978,796

(22) Filed: Oct. 16, 2001

(65) Prior Publication Data

US 2002/0046234 A1 Apr. 18, 2002

(30) Foreign Application Priority Data

Oct. 16, 2000 (DE) ................................ 100 51 130

(51) Int. Cl.
- G06F 19/00 (2006.01)
- G06F 15/00 (2006.01)
- G06F 15/02 (2006.01)
- G06F 9/46 (2006.01)
- G06F 15/16 (2006.01)

(52) U.S. Cl. ................ 700/95; 700/1; 700/9; 718/100; 718/106; 709/201; 709/203; 705/8; 705/9

(58) Field of Classification Search .................... 700/9, 700/89, 1, 95; 709/227, 201–203; 705/8–9; 703/1; 718/100–108
See application file for complete search history.

(56) References Cited

U.S. PATENT DOCUMENTS

| | | | | |
|---|---|---|---|---|
| 5,754,857 A | * | 5/1998 | Gadol | ................... 709/203 |
| 5,867,824 A | * | 2/1999 | Saito et al. | ................... 705/9 |
| 6,032,124 A | * | 2/2000 | Saito et al. | ................... 705/9 |
| 6,430,538 B1 | * | 8/2002 | Bacon et al. | ................ 705/9 |
| 6,594,691 B1 | * | 7/2003 | McCollum et al. | ......... 709/218 |
| 6,694,198 B2 | * | 2/2004 | Takaku et al. | ................ 700/83 |
| 6,728,947 B1 | * | 4/2004 | Bengston | .................... 717/103 |
| 6,931,365 B1 | * | 8/2005 | Mehta et al. | .................. 703/1 |
| 2002/0002407 A1 | * | 1/2002 | Takaku et al. | ................ 700/9 |
| 2003/0172164 A1 | * | 9/2003 | Coughlin | .................... 709/227 |
| 2004/0019512 A1 | * | 1/2004 | Nonaka | ........................ 705/8 |
| 2004/0230980 A1 | * | 11/2004 | Koyama et al. | ............ 718/103 |

FOREIGN PATENT DOCUMENTS

| WO | WO 00/02107 | 1/1999 |
|---|---|---|
| WO | WO 00/20938 | 5/1999 |

OTHER PUBLICATIONS

Habib et al., "Simulation Enviroment for an Autonomous and Decentralized Multi-Agent Robotic System", IEEE, 1992, pp. 1550-1557.*

* cited by examiner

*Primary Examiner*—Meng-Al T. An
*Assistant Examiner*—Jennifer N. To

(57) ABSTRACT

The invention relates to the organization of network-wide applications to indicate a possible way by which future requirements of decentralized control systems connected together via a network can be implemented simply and cost-efficiently with high efficiency. A system and a computer program which, in order to provide consistent support to the organization of a process having at least one processing device for carrying out predefinable subprocesses, permit subprocess-specific process structure information to be registered and stored on the basis of the process to be organized in such a way that said information can be used on the basis of predefinable subprocesses or on the basis of a respective organization phase.

15 Claims, 2 Drawing Sheets

METHOD FOR THE ORGANIZATION OF A PROCESS HAVING AT LEAST ONE PROCESSING DEVICE FOR CARRYING OUT A PREDEFINABLE SUBPROCESS

CROSS-REFERENCES OF RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a method for the organization of a process having at least one processing device for carrying out a predefinable subprocess, and also a system and computer program suitable for carrying out the method.

TECHNICAL FIELD

In the course of continuously increasing automation and increasingly powerful information technology, work is being carried out in many areas to structure processes of a very wide range of types in an increasingly decentralized manner. For example, it is assumed that in the future the control systems needed for the processes will be designed to be significantly more decentralized and/or will be allocated to individual subprocesses than is currently possible, technically or on account of an expenditure on costs which to some extent is still high.

Although individual control components are already being designed in an ever more modular fashion nowadays, and often have operating devices which are already associated and with which network-wide possible programming of the control components is achieved, furthermore, to date only inadequate mechanisms have been provided to permit or to provide network-wide access to variables in particular and/or to ensure network-suitable or network-integrating project engineering, programming, operation and/or documentation. Although many approaches and ideas relating to the purely decentral network have been propagated for some years, in the case of the applications and/or developments currently present, these still do not find a basis. One reason for this is grounded in particular in the fact that substantially all the network systems which are present and which, in particular, are highly focused on highly specialized requirements of individual sectors come close to their performance limit. Consequently, the network systems used hitherto have to be substantially completely reorganized in order to be able to provide a stable approach to the solution in the short to medium term.

In particular in the areas of control systems and/or control components, although various different, new approaches are already being pushed forward, these approaches, which are substantially all currently emerging, generally continue to be based on a centralistic approach.

SUMMARY OF THE INVENTION

It is therefore an object of the invention to indicate one possible way in which coming requirements of decentralized control systems connected together via a network can be implemented simply and cost-efficiently with a high efficiency.

The achievement of the object according to the invention is characterized by a method for the organization of a process having at least one processing device for carrying out predefinable subprocesses which comprises the following steps: a) registration of subprocess-specific process structure information as a function of the process to be organized; b) storage of the process structure information in at least one storage device; c) on the basis of predefinable subprocesses, calling up stored process structure information; and d) use of the called process structure information on the basis of a respective, organization phase. The achievement of the object according to the invention is characterized in a system for the organization of a process according to the invention, comprising at least one processing device for carrying out a predefinable subprocess; a control device assigned to the at least one processing device; at least one programmable processor device for at least one of identifying and calling subprocess-specific process structure information on the basis of the process to be organized; and at least one storage device in which the process structure information can be stored; a network, which is designed as an interface between the processing device and the storage device and the programmable processor devices. The achievement of the object of the invention is also characterized by a computer program for carrying out a method according to the invention, which comprises a program unit for the identification, storage and/or calling of a subprocess and an item of the process structure information that can be allocated to a processing device provided for execution, and/or for the supply of selected process structure information to the respectively associated processing devices.

According to the invention, provision is therefore made to organize a process having at least one processing device concerned with carrying out a predefinable subprocess, first of all to register subprocess-specific process structure information on the basis of the process to be organized and to store it in a storage device in such a way that, on the basis of selected subprocesses, the stored, appropriate process structure information can be called up for use on the basis of a respective organization phase.

What is advantageous in this case is in particular the fact that, substantially irrespective of the respective organization phase, that is to say substantially irrespective of whether this is the planning, compilation or operating phase, there is free accessibility to any subprocess-specific process structure. In other words, according to the method of the invention, the process structure information can now for the first time be called up and processed, displayed and/or used for the direct operation of the corresponding processing device autonomously and/or in combination, for example on the basis of interlinked subprocesses, depending on the organization phase.

Consequently, the solution of the invention is based on the idea that the processing devices for carrying out subprocesses themselves form the core elements of a respective process, and are the bearers of a subprocess-specific function substantially independent of the system structure used to carry out the method. Registering the respective subprocess-specific process structure information, based on this approach, as a result of which individual allocation to substantially each individual processing device influencing the process is ensured, is consequently consistently supported, that is to say, in each phase, a central structure as far as a decentrally constructed structure of the process to be organized.

In particular in order to ensure unambiguous correspondence between the individual process structure information and the associated subprocesses, including the processing devices provided to carry them out, the registration of the process structure information includes, in a preferred refinement, registering subprocesses which have a relationship with one another, such as the interlinking of individual items of process structure information with regard to associated and/or mutually dependent subprocess sections, registering physical characteristics, such as the function, activity and/or task of the processing device and/or its classification within the process and/or registering logical characteristics, for example in the form of processing-device-specific characteristics, in particular whether this is a sensor and/or actuator device, which variables or parameters have to be read in or output and/or system-specific parameters, such as the time behavior within the process to be carried out, all the aforementioned structure elements expediently being identified while taking into account respective application-based safety aspects.

In an advantageous refinement, provision is made to supply the process structure information to a control device associated with the processing device that is to carry out the corresponding subprocess. Such a control device can be included by the processing device itself, with the use of mechatronics, or can be associated with the processing device as an additional element. As a result of the incorporation of the processing device itself, if appropriate via the control element additionally associated with the processing device, into the total control concept, decentralized control of the process to be organized is substantially supported, and higher-order control is ultimately no longer needed. By this means, a process to be organized can be expanded and/or changed in a flexible way, that is to say in particular in a modular way, simply and in an application-specific manner by means of individual subprocesses or by the processing devices that are to carry out the individual subprocesses. A higher-order control system no longer needs primarily or at every time, by means of a complex total control program to be implemented, to have knowledge about each subprocess or each processor device to carry it out, since substantially every subprocess can be controlled decentrally via the control device associated with the processor device to carry it out.

In a practical refinement, provision is further preferably made, between the storage device for storing the individual items of process structure information and the processor devices that are to carry out the individual subprocesses, to provide, as interface, a network in such a way that it advantageously appropriately organizes the substantially complete transport of the individual process structure information and the data contained therein, which permits further-reaching decentralization of the process and/or system structure including the physical structure of an overall plant in which the process has to be organized. In this case, it is additionally advantageous that, depending on the process and or application area, an appropriately suitable network including its access mechanisms can be adapted freely and/or can be connected to further networks, as is already currently implemented, for example in the case of an Intranet and/or Internet.

For the purpose of optimizing in particular the data transport and the substantially automated distribution of items of process structure information that are called up, in a practical development the invention further provides for a freely configurable bus system for the data transport to be organized.

In order to ensure access to selected process structure information substantially for each organization phase, provision is further made for this information to be capable of being called up at selected user platforms. Depending on the user-dependent further use of this information, the user platforms in this case can be of purely passive design, in order for example to support pure visualization and/or can be constructed as interactive user platforms which, in a user-specific or personnel-specific manner, support further processing of the information, for example programming or maintenance of individual subprocesses. By this means, substantially all those involved in the process, irrespective of the respective real physical conditions of the process to be organized, can recognize their respective specific part significantly more simply, can organize better and/or adapt appropriately to their requirements, and also take appropriate action in their respective tasks.

A system according to the invention and suitable for such organization of a process to this end comprises at least one processing device and one control device associated with the processing device, a programmable processor device for identifying and/or accessing subprocess-specific process structure information, at least one storage device and a network designed as an interface between these devices.

In an advantageous development, provision is further made for a processing device designed as an actuator additionally to contain a sensor device, which observes the functioning of the actuator in the process and, as a result, the documentation, visualization, diagnosis and/or, by using the data obtained, simulation of selectable subprocesses can be carried out.

In a practical refinement, the invention further provides for the individual items of process structure information to be capable of being registered and stored under an identification code within the network, parameterized in accordance with the time response of the process that is to be carried out, for the purpose of being called up individually and/or distributed automatically to the respective processing devices that are to carry out the individual subprocesses.

Furthermore, in particular, for reasons of costs, the invention provides refinements in which the control devices associated with the individual processing devices, instead of intelligent processing devices, are provided as additional control elements, since substantially, on account of the processor powers which are conventionally already present, the proportion of the cost which is required as a result can be estimated as being significantly lower as compared with an intelligent processing device.

If the network organizing the data transport comprises a freely configurable bus, it is thus ensured that, depending on the field of application or process-specific tasks, a correspondingly suitable synchronization and project engineering functionality can be achieved.

A corresponding application program or computer program according to the invention comprises in particular a programming unit for the identification, storage and/or calling of process structure information and/or for the in particular automatic supply of process structure information to the corresponding processing devices and/or to the respectively associated control devices.

BRIEF DESCRIPTION OF THE DRAWINGS

The invention will be described in detail below using an exemplary network-wide application, with reference to the appended drawings, in which.

DETAILED DESCRIPTION OF THE INVENTION

Figure 1:
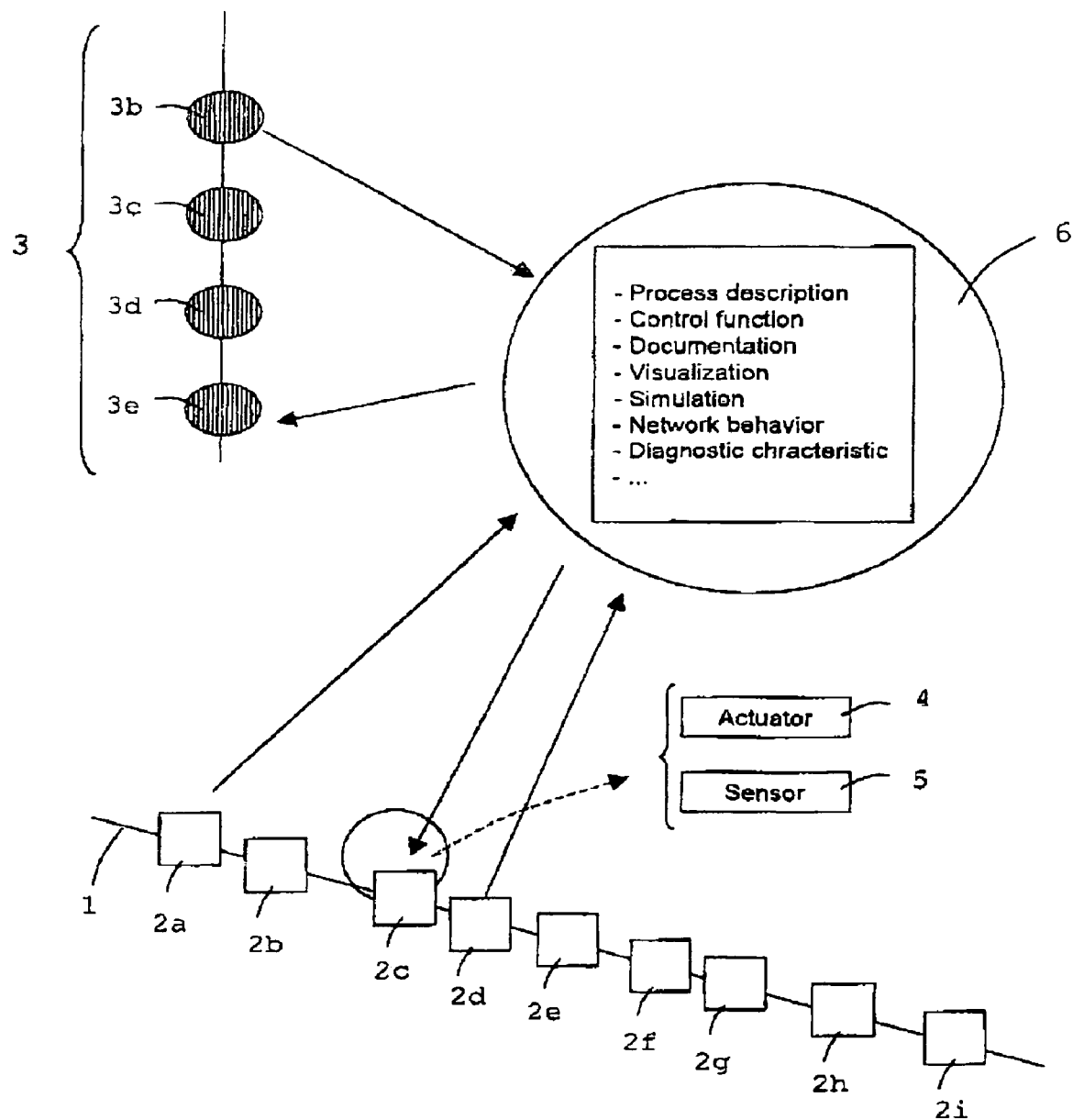
FIG. 1 shows a very simplified basic sketch of an exemplary embodiment according to the invention of the organization of a process within a network-wide system.

In the following text, reference will be made firstly to FIG. 1, which shows a system having a large number of process components $2a$ to $2i$ interconnected via a network 1 for carrying out an overall process 3 comprising a number of subprocesses $3b$ to $3e$. Each of the process components $2a$ to $2e$ comprises processing devices appropriately adapted to carry out subprocesses allocated to them, of which, by way of example, an actuator 4 and a sensor 5 are illustrated as separated blocks.

The organization principle according to the invention then assumes, counter to the previous approaches, that the actuator and sensor elements 4 and 5 respectively integrated into the system are to be incorporated into the overall control concept of the process 3 to be organized.

Thus, the sensor element 5 on the one hand assumes an increasingly more weighty cost factor, in particular during the planning and/or calculation of a system, which is substantially caused by the ever-increasing requirement for information. On the other hand, such a sensor element 5, because of the continuously developing technologies, influences to a sharply increasing extent weighty identification factors of current and future machine plants and systems, in particular in relation to their quantity, flexibility, quality and/or safety characteristics.

However, an actuator, given the reference number 4 by way of example in FIG. 1, also forms the actual core element of each system, since it is defined by its specific function in the process, such as the execution of a specific subprocess, in which it is generally observed or monitored, by its conventionally lower number of sensor elements used by comparison and usually by its mode of operation, for example as a circuit breaker for actuators including other media based, for example, on pneumatics, hydraulics and/or heat, and/or as a movement controller for example for regulated or nonregulated drives for guidance or feedback or positioning.

According to the invention, the actuator 4 therefore forms the starting point of the process organization, which means that irrespective of the network structure, the project engineering and documentation of a process begins with the actuators. For this purpose, with reference to FIG. 1, first of all systematic structuring of each individual subprocess for which an actuator 4 is provided has to be performed. Such systematic structuring 6 in accordance with the present exemplary embodiment comprises in particular analyzing the process, including the description of the respective subprocess, control functions to be carried out in each case, application-specific documentation and also suitable visualization parameters and, if necessary, parameters for the purpose of simulation by means of a model, also taking into account network-specific behavior, in particular with regard to the time response and diagnostic characteristics. Such items of process structure information 6, also registered in a practical application in particular from the point of view of systematic safety, are subsequently parameterized in order to drive corresponding processing devices needed for this purpose and are defined in individual application programs. The individual items of subprocess-specific information 6 are therefore unambiguously described via the process sequence, interlinking of associated part steps substantially being carried out, for example in that according to FIG. 1 subprocess $3c$ as to be carried out after subprocess $3b$ has been carried out and/or, based on this, has to be carried out before subprocess $3d$ is carried out, in addition via a physical allocation, for example in that the process component $2d$ provided to carry out subprocess $3e$ in the network is incorporated between the process components $2c$ and $2e$, and also via a logical allocation, for example whether and how the actuator 4 and/or the sensor 5 is addressed, what variables have to be read in or output for this purpose and also corresponding network-specific parameters, such as in particular the time response.

Using this unambiguous description based on the individual structural elements of substantially every individual subprocess, autonomous processing of each individual item of process structure information 6 is consequently ensured during each organization phase, that is to say substantially beginning with the planning via the compilation and project engineering, including the parameterization required for this, programming and simulation as far as the operation of the overall process 3, but also in combination, as a result of which a system structure which is central up to a purely decentrally constructed system structure is consistently supported.

These items of process structure information 6 are stored such that they can be called up at any time via system- and/or network-specific identification codes, the actions of calling up and automatically distributing them to the respective process components $2a$ to $2i$ during process operation, as described in more detail below, being carried out automatically, in particular via the linking data contained in the individual items of process structure information 6.

Because of the distribution of this parameterized structural information 6 to the respective processing devices, the actuator 4 or the sensor 5 is consequently equipped with its own intelligence, so that a higher-order control system acts substantially superfluously.

It should be mentioned at this point that, depending on the extent to which, for example, the actuator 4 is designed with its own intelligence, for the case in which interlinking of a number of items of information is needed, a corresponding application program containing these items of information is loaded directly into its own, integrated control unit, or into a control unit additionally specifically allocated to this actuator, such as a further actuator or a concentrator.

Figure 2:
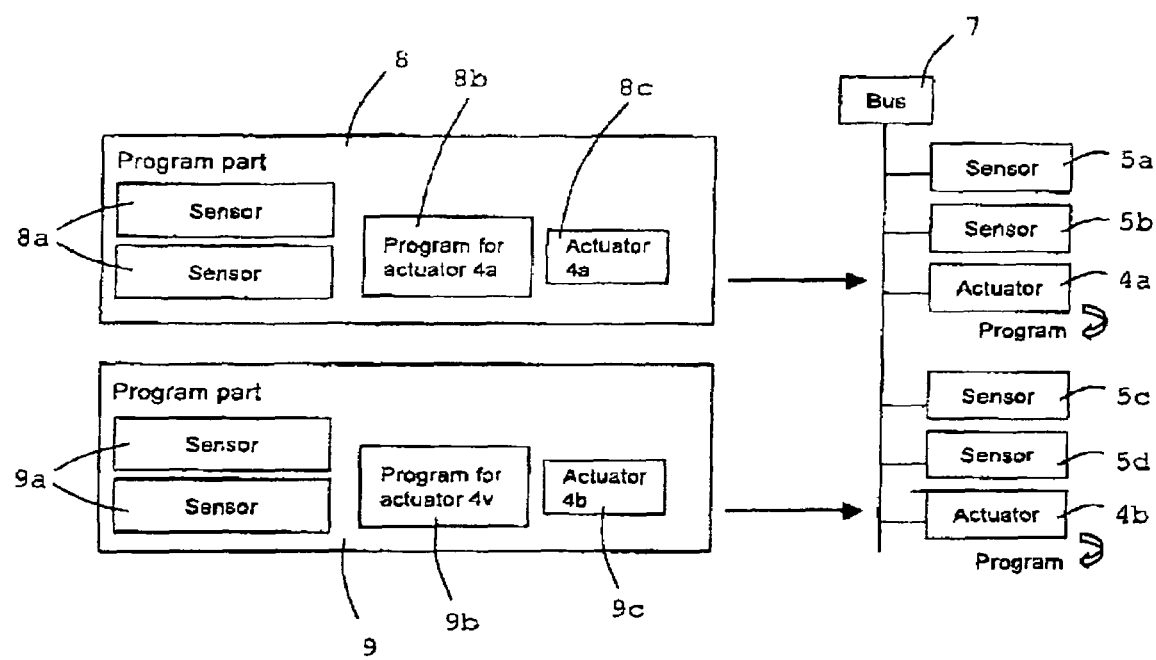
FIG. 2 shows a simplified block diagram relating to the distribution of various items of process structure information defined within application programs to the respective processing devices that are to carry out the corresponding subprocess.

An example of such loading and automatic distribution of appropriate programs 8, 9 is shown in FIG. 2. In this case, a freely configurable bus 7 provides the input/output interface for the individual processing devices, according to FIG. 2 a first actuator with two sensors $5a$ and $5b$ assigned to it and a second actuator $4b$ with two sensors $5c$ and $5d$ assigned to the latter. In order to carry out the respective subprocesses allocated to the actuator $4a$ and the actuator $4b$, respectively, the respective application programs 8 and 9 to be called up and loaded contain corresponding information $8a$, $9a$ for the inputs and/or outputs of the sensors $5a$, $5b$, and $5c$, $5d$ allocated to the respective actuator $4a$ and $4b$, the parameterized function sequences and activity sequences $8b$, $9b$ necessary to carry out the subprocess and also the appropriate physical and/or logic allocations $8c$, $9c$ needed for the automatic distribution with regard to the actuator $4a$ and $4b$. The network or the bus 7 in the case of FIG. 2 in this case organizes substantially only the transport of this process structure information 6 and, with appropriately suitable or application-specific tools, hardware and software mechanisms and/or organization rules for the real operation, ensures the fundamental synchronization and project engineering functionality.

If a new subprocess or one to be replaced is incorporated, for example the subprocess 3b according to FIG. 1, or the process components 2c correspondingly provided for this purpose and having the actuator and sensor device 4 and 5, these merely have to be connected to the network and the corresponding, above-described process structure information 6 has to be loaded, via the bus 7, into the control unit of the actuator 4 and/or into the control unit associated with it, in order for example to carry out the newly inserted subprocess 3e. On the basis of the control intelligence which, as already explained above, is now of decentralized design as a result of the invention, which makes a higher-order intelligence or overall control of the system or of the process substantially superfluous, the invention supports network-wide applications and also those going beyond the network even for purely decentralized system structures, substantially during every organization phase.

Because of the systematic structuring of the individual functions or activities to be carried out, it is furthermore true that substantially every person involved in the process, that is to say from the process engineer to the operating and maintenance personnel, is in a position, via appropriate user platforms connected to the network, to recognize his specific part more simply, to organize it better and to continue to process or adapt it in accordance with the respective requirements. As a result of the bundling and concentration of the process and system information onto the respective processing devices influencing the overall process, the invention thus supports the process organization during every phase and substantially irrespective of whether the software and hardware used, including the machines and plant used, are structured centrally, decentrally or in mixed form.

What is claimed is:

1. A method for organizing a process in a decentralized control system in industrial automation technology having at least one processing device for carrying out predefinable subprocesses of said process, wherein the at least one processing device comprises an actuator, with which a sensor device is associated, said method comprising the following steps:
    a) registering individual items of subprocess-specific process structure information as a function of the process to be organized, comprising the steps of registering subprocesses associated with a specific subprocess and registering physical and logical characteristics of the processing device that is to carry out the specific subprocess;
    b) storing the subprocess-specific process structure information in at least one storage device;
    c) on the basis of predefinable subprocesses, accessing stored subprocess-specific process structure information, and
    d) processing the accessed subprocess-specific process structure information, displaying the accessed subprocess-specific process structure information or using the accessed subprocess-specific process structure information for the direct operation of the corresponding processing device depending on an organization phase selected from the group consisting of planning phase, compilation phase and operating phase.

2. The method as claimed in claim 1, wherein step d) comprises supplying the subprocess-specific process structure information to a control device associated with the processing device that is to carry out the corresponding subprocess, in order to control the processing device.

3. The method as claimed in claim 2, wherein the steps c) and d) are carried out by a network that functions as an interface between the storage device and the processing device.

4. The method as claimed in claim 2, wherein the subprocess-specific process structure information is supplied automatically to the control device.

5. The method as claimed in claim 1, wherein steps c) and d) are carried out by using a freely configurable bus system.

6. The method as claimed in claim 1, wherein, further, under step d) selectable process structure information is provided to a user platform for user-dependent further use.

7. A decentralized control system having a plurality of processing devices connected together via a network for organizing a process, said process comprising a number of subprocesses, the decentralized control system comprising:
    at least one of said plurality of processing devices for carrying out a predefinable subprocess, wherein the at least one processing device comprises an actuator, with which a sensor device is associated;
    a registration means for registering individual items of subprocess-specific process structure information as a function of the process to be organized by the at least one processing device, wherein registration including registration of associated subprocesses and of physical and logic state of the at least one processing device that is to carry out the specific subprocess;
    a storage device for storing the subprocess-specific process structure information; a control device assigned to the at least one processing device for controlling the processing device,
    a programmable processor device for calling the subprocess-specific process structure information based on the process to be organized;
    means for automatically linking, via the network, the processing devices and the individual items stored in the storage device in response to the calling of said subprocess-specific process structure information and loading of the respective subprocess-specific process structure information into the control device;
    wherein the individual items of the subprocess-specific process structure information is registered, stored, and called using an identification code.

8. The system as claimed in claim 7, wherein the control device is part of the processing device.

9. The system as claimed in claim 7, wherein the processing device is assigned an additional control device.

10. The system as claimed in claim 7, wherein the network comprises a freely configurable bus.

11. The system as claimed in claim 10, wherein the bus has at least one interference for the connection of a connecting network.

12. The system as claimed in claim 7, wherein the at least one processing device is connected to at least one user platform for user-specific processing of selectable process structure information.

13. A computer program stored in a computer media for organizing a process in a decentralized control system in industrial automation technology having at least one processing device for carrying out predefinable subprocesses of said process, wherein the at least one processing device comprises an actuator, with which a sensor device is associated, when executed by a computer said computer performing the method of:

a) registering individual items of subprocess-specific process structure information as a function of the process to be organized, wherein said subprocess-specific process structure information is associated with a specific subprocess of the process to be organized and with a processing device provided for execution of said specific subprocess;
b) storing the subprocess-specific process structure information in at least one storage device;
c) on the basis of predefinable subprocesses, accessing stored subprocess-specific structure information; and
d) processing the accessed subprocess-specific process structure information, displaying the accessed subprocess-specific process structure information or using the accessed subprocess-specific process structure information for the direct operation of the corresponding processing device depending on an organization phase selected from the group consisting of planning phase, compilation phase and operating phase.

14. A computer program as claimed in claims 13, wherein the step d) comprises supplying of selected subprocess-specific structure information to a respectively associated processing devices.

15. The computer program as claimed in claim 14, wherein the step of supplying selected subprocess-specific process structure information to the respectively associated processing devices is performed in response to structural elements contained within the respective subprocess-specific process structure information.

* * * * *